United States Defensive Publication [19] (H) [11] T104,902

Parton et al. [43] Dec. 4, 1984

[54] ADSORBABLE ARYLHYDRAZIDES AND APPLICATIONS THEREOF TO SILVER HALIDE PHOTOGRAPHY

[76] Inventors: Richard L. Parton; James A. Friday, both of Kodak Park Div., Rochester, N.Y. 14650

[21] Appl. No.: 577,420

[22] Filed: Feb. 6, 1984

Related U.S. Application Data

[62] Division of Ser. No. 493,554, May 11, 1983, Pat. No. 4,459,347.

[51] Int. Cl.[3] ..... G03C 1/28

[52] U.S. Cl. ..... 430/603; 430/598; 564/78

[57] ABSTRACT

The use of oxythioamido substituted arylhydrazides in producing images in silver halide photographic elements is disclosed. The oxythioamido substituted arylhydrazide can be incorporated in photographic silver halide emulsions. The oxythioamido substituent is capable of promoting adsorption of the arylhydrazide to silver halide grain surfaces. In negative working surface latent image forming emulsions the oxythioamido substituted arylhydrazides permit higher speeds to be achieved. In direct positive internal latent image forming emulsions increased nucleation activity can be achieved.

6 Claims, No Sheets Drawing,

75 Pages Specification

The file of this unexamined application may be inspected and copies thereof may be purchased (849 O.G. 1221, Apr. 9, 1968).